United States Patent [19]
McFalls

[11] Patent Number: 5,403,038
[45] Date of Patent: Apr. 4, 1995

[54] VEHICLE OCCUPANT RESTRAINT APPARATUS

[75] Inventor: Bob L. McFalls, Shelby Township, Macomb County, Mich.

[73] Assignee: TRW Vehicle Safety Systems Inc., Lyndhurst, Ohio

[21] Appl. No.: 788,546

[22] Filed: Nov. 6, 1991

[51] Int. Cl.⁶ .................. A44B 11/25; B60R 22/00
[52] U.S. Cl. .................. 280/808; 297/483; 24/573.1
[58] Field of Search ............... 280/801, 808; 297/468, 297/483, 486; 24/573.1, 573.2, 573.6, 163 R

[56] References Cited

U.S. PATENT DOCUMENTS

| | | | |
|---|---|---|---|
| 2,834,607 | 5/1958 | Higgins | 280/808 |
| 3,415,538 | 12/1968 | Radke et al. | 297/481 |
| 3,478,833 | 6/1969 | Rice | 297/474 |
| 3,451,720 | 6/1969 | Makinen | 297/483 |
| 3,494,665 | 2/1970 | Klink | 24/573.1 |
| 3,542,426 | 11/1970 | Radke | 24/573.1 |
| 3,600,768 | 8/1971 | Romanzi et al. | 24/573.5 |
| 3,626,556 | 12/1971 | Struck | 24/633 |
| 3,790,209 | 2/1974 | Littmann | 297/483 |
| 3,845,524 | 11/1974 | Hull et al. | 24/573.1 |
| 3,885,811 | 5/1975 | Takada | 297/483 |
| 3,925,853 | 12/1975 | Nicklin | 297/483 |
| 3,995,885 | 12/1976 | Plesniarski | 297/483 |
| 4,302,049 | 11/1981 | Simpson | 297/484 |
| 4,809,410 | 3/1989 | Van Riesen | 24/573.6 |
| 4,915,413 | 4/1990 | Meyer | 280/801 |

*Primary Examiner*—Karin L. Tyson
*Attorney, Agent, or Firm*—Tarolli, Sundheim & Covell

[57] ABSTRACT

A latch member for a vehicle occupant restraint apparatus has an anchor portion, a first tongue portion and a second tongue portion. The anchor portion connects the latch member to a lap belt. The first tongue portion of the latch member is movable into a passage in a seat belt buckle, and has a first opening for receiving a locking element in the seat belt buckle to lock the first tongue portion in the buckle. The second tongue portion of the latch member is movable into a passage in another seat belt buckle, and has a second opening for receiving a locking element in the other seat belt buckle to lock the second tongue portion in the other buckle.

1 Claim, 4 Drawing Sheets

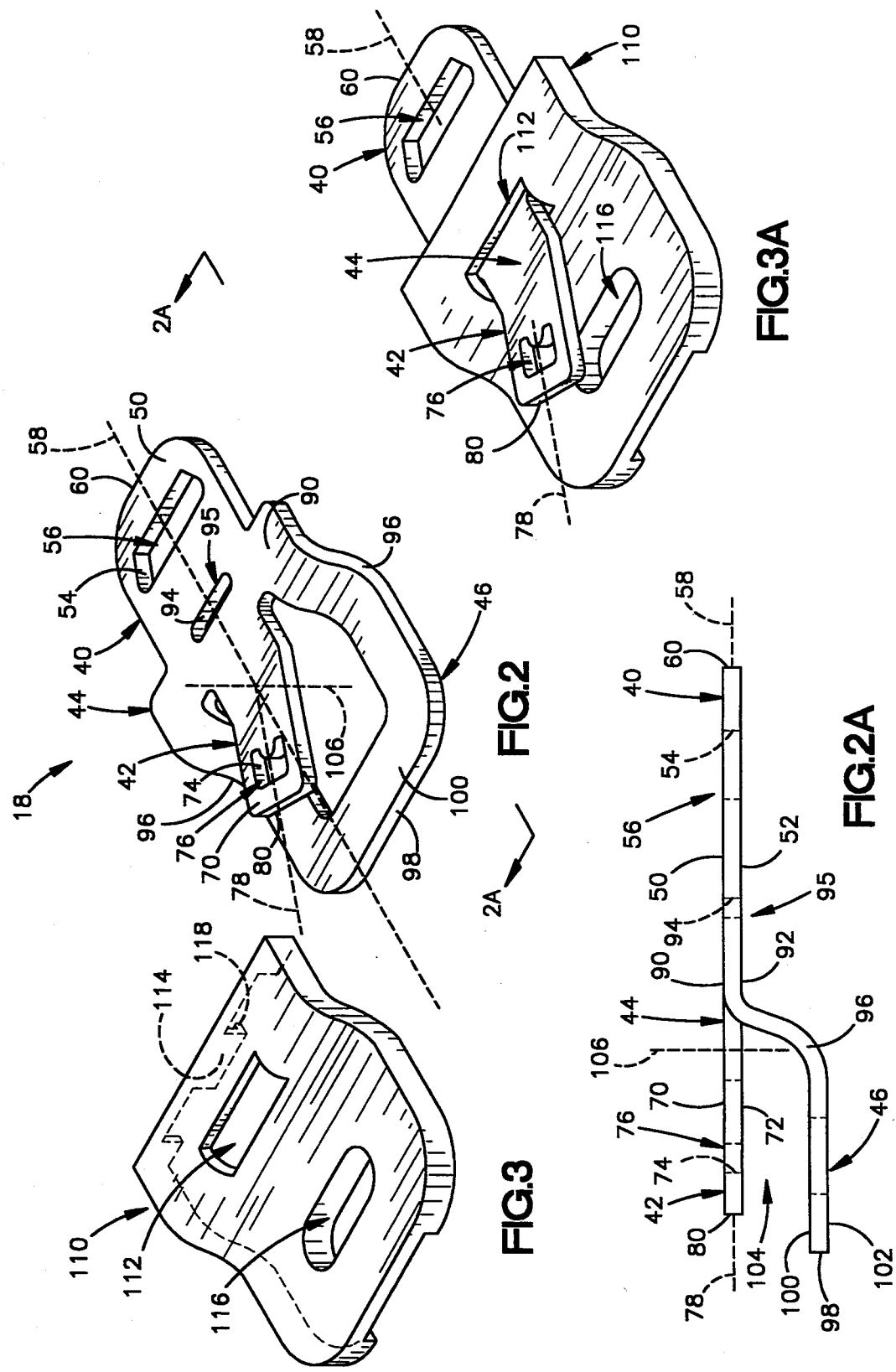

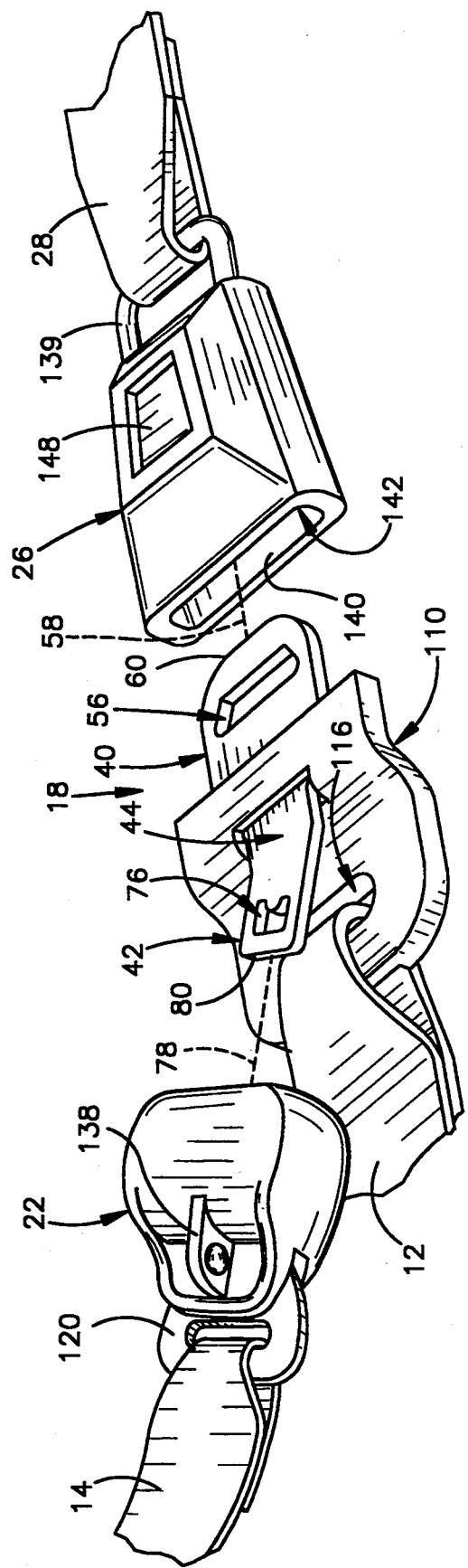
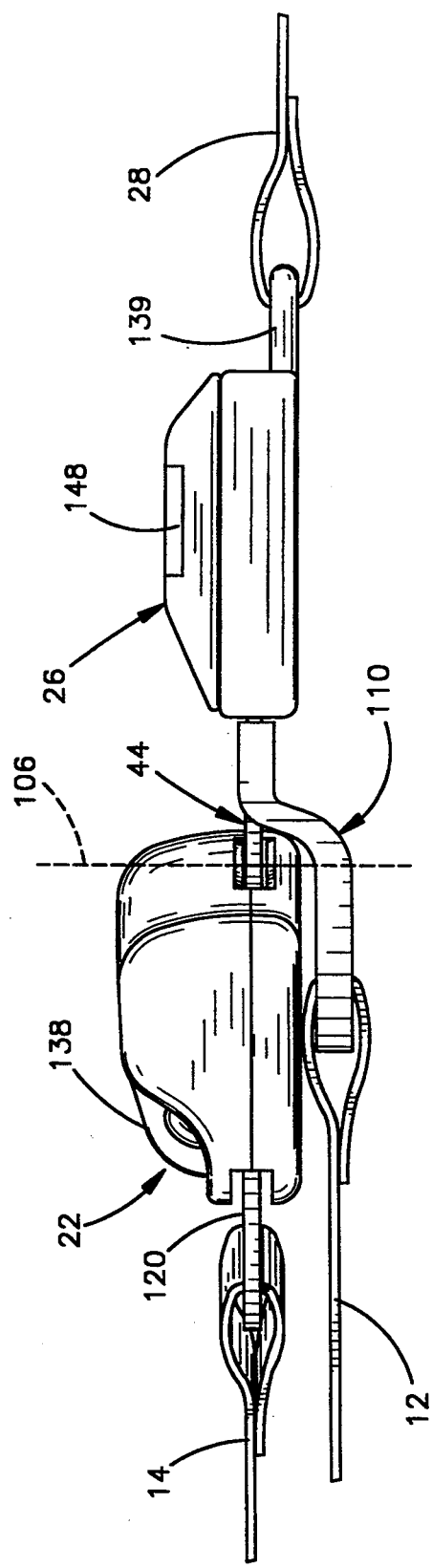

VEHICLE OCCUPANT RESTRAINT APPARATUS

FIELD OF THE INVENTION

The present invention relates to an apparatus for restraining a vehicle occupant, and particularly relates to an apparatus including a lap belt and a shoulder belt for restraining the vehicle occupant.

BACKGROUND OF THE INVENTION

U.S. Pat. No. 4,915,413 discloses an apparatus for restraining a vehicle occupant. The apparatus disclosed in the '413 patent includes a lap belt and a shoulder belt which are each movable between retracted positions at the outboard side of a vehicle seat and restraining positions extending across an occupant of the seat. One end of the lap belt is wound on a retractor at the outboard side of the seat. The other end of the lap belt is connected to a tongue which is releasably lockable in a buckle located at the inboard side of the seat. One end of the shoulder belt is wound on a retractor at the outboard side of the seat, and the other end of the shoulder belt is connected to a connector plate. The connector plate has a rivet which is releasably receivable in an opening in the tongue at the end of the lap belt. The connector plate and the shoulder belt are thus releasably connectable with the tongue and the lap belt.

When the connector plate and the shoulder belt are connected to the tongue and the lap belt, the shoulder belt and the lap belt are movable together across the seat between the retracted and the restraining positions. When the connector plate and the shoulder belt are disconnected from the tongue and the lap belt, the lap belt can be moved back and forth between its retracted and restraining positions while the shoulder belt remains in its retracted position.

SUMMARY OF THE INVENTION

In accordance with the present invention, a latch member for a vehicle occupant restraint apparatus comprises an anchor portion for attachment to the vehicle, a first tongue portion and a second tongue portion. The first tongue portion of the latch member is movable into a passage in a seat belt buckle, and has a first opening for receiving a locking element of the seat belt buckle to lock the first tongue portion in the buckle. The second tongue portion of the latch member is movable into a passage in another seat belt buckle, and has a second opening for receiving a locking element of the other seat belt buckle to lock the second tongue portion in the other buckle.

In a preferred embodiment of the invention, the anchor portion of the latch member comprises an anchor bar around which the end of a lap belt is fastened in a loop. The first tongue portion of the latch member is lockable in a buckle which is anchored to the vehicle at one side of a seat. The second tongue portion of the latch member is lockable in a buckle which is connected to the end of a shoulder belt. When the buckle on the shoulder belt is locked to the latch member, the shoulder belt and the lap belt are movable together across the seat with the latch member. When the buckle on the shoulder belt is unlocked from the latch member, the lap belt is movable back and forth across the seat with the latch member independently of the retracted shoulder belt. The anchor bar, the first tongue portion and the second tongue portion of the latch member are arranged relative to each other so that the buckle on the shoulder belt and the buckle at the other side of the seat are located in a compact arrangement when connected to each other by the latch member.

BRIEF DESCRIPTION OF THE DRAWINGS

The foregoing and other features of the present invention will become apparent to those skilled in the art to which the invention relates upon reading the following description of the invention with reference to the accompanying drawings, wherein.

FIG. 2 is a view of a part of the apparatus of FIG. 1;

FIG. 2A is a view taken on line 2A—2A of FIG. 2;

FIG. 3 is a view of another part of the apparatus of FIG. 1;

FIG. 3A is a view of the parts of FIGS. 2 and 3 in an assembled condition;

FIG. 6 is a view of parts of the apparatus of FIG. 1 in a disconnected condition; and FIG. 7 is a view of the parts of FIG. 6 in a connected condition.

DESCRIPTION OF PREFERRED EMBODIMENT

Figure 1:
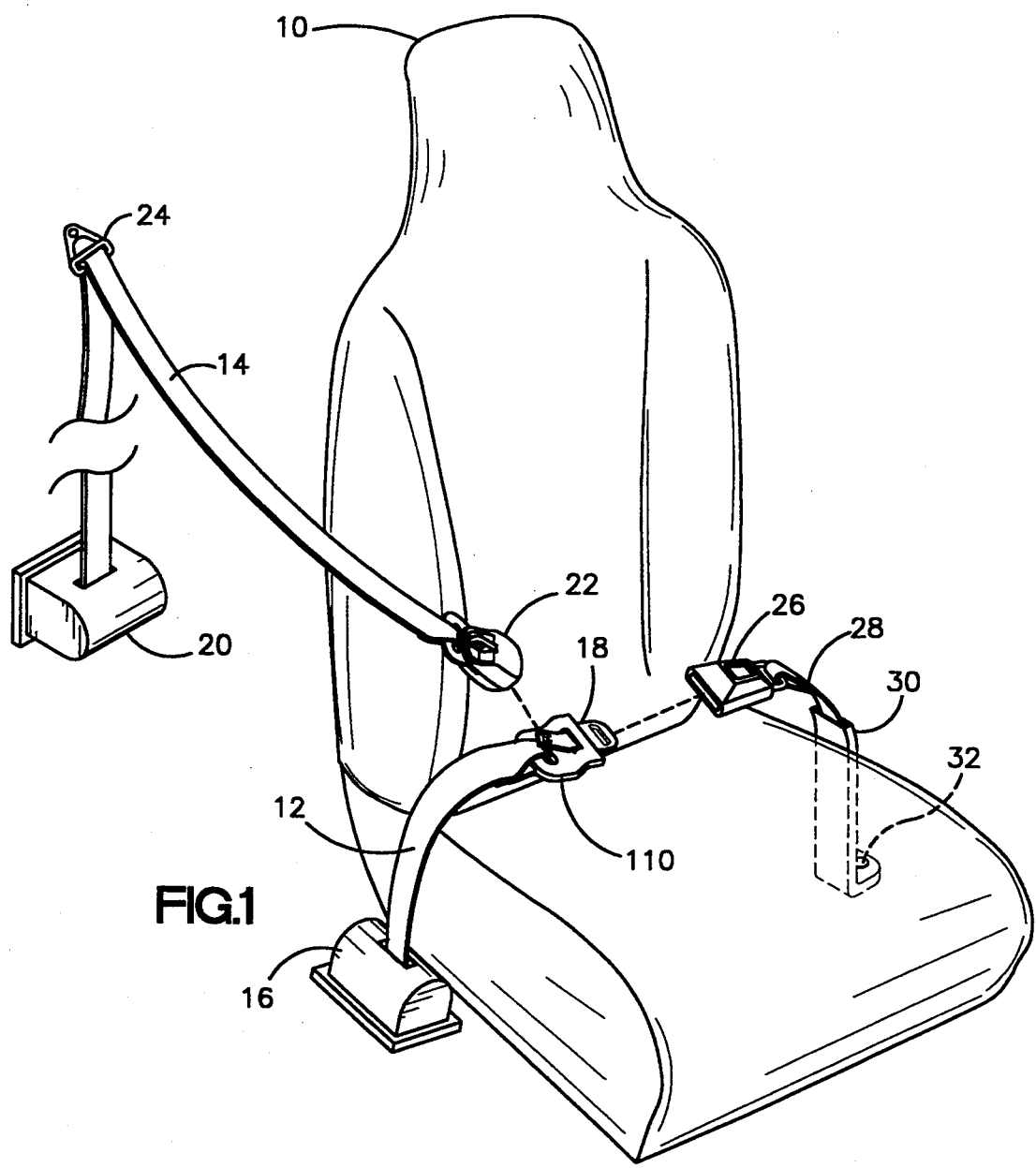
FIG. 1 is a view of a vehicle seat and a vehicle occupant restraint apparatus constructed in accordance with the present invention.

As shown in FIG. 1, an apparatus for restraining an occupant of a vehicle seat 10 comprises a lap belt 12 and a shoulder belt 14. The lap belt 12 has one end wound on a retractor 16, which is fixed to the vehicle, and another end connected to a latch member 18. The shoulder belt 14 similarly has one end wound on a retractor 20, which is fixed to the vehicle, and another end connected to a buckle 22. The shoulder belt 14 extends through a D-ring 24 which is fixed to the vehicle adjacent to the shoulder of an occupant of the seat 10. The apparatus shown in FIG. 1 also includes a buckle 26 which is anchored to the vehicle at the side of the seat 10 opposite the side where the retractors 16 and 20 and the D-ring 24 are fixed to the vehicle. The buckle 26 is anchored to the vehicle by a strap 28 supported in a relatively rigid sleeve 30 and fixed to the vehicle by a bolt 32.

The lap belt 12 and the shoulder belt 14 are movable from retracted positions at the side of the seat 10 to restraining positions extending across an occupant of the seat 10. As indicated by the dashed lines in FIG. 1, the latch member 18 is movable into and out of locked engagement with the buckle 26 at the opposite side of the seat 10. The buckle 22 connected to the shoulder belt 14 is movable into and out of locked engagement with the latch member 18. When the buckle 22 is locked to the latch member 18, the lap belt 12 and the shoulder belt 14 are movable together across the seat 10 toward and away from the buckle 26. Because the buckle 22 is releasable from the latch member 18, the shoulder belt 14 can be retracted independently of the lap belt 12 so that the lap belt 12 can be moved into and out of its restraining position independently of the shoulder belt 14.

As shown in FIGS. 2 and 2A, the latch member 18 is a single piece of stamped metal having a first tongue portion 40 and a second tongue portion 42. The latch member 18 also has a base portion 44 and an anchor portion 46.

The first tongue portion 40 of the latch member 18 has a planar upper surface 50, a planar lower surface 52 parallel to the planar upper surface 50, and an inner edge surface 54. The inner edge surface 54 defines an opening 56 extending through the first tongue portion 40 between the upper and lower surfaces 50 and 52. The first tongue portion 40 is symmetrical about a first axis 58 of the latch member 18, and also has a leading edge 60 which is spaced from the opening 56 along the first axis 58.

The second tongue portion 42 of the latch member 18 has an upper surface 70 coplanar with the upper surface 50 of the first tongue portion 40, and has a lower surface 72 coplanar with the lower surface 52. An inner edge surface 74 defines an opening 76 extending through the second tongue portion 42 between the upper and lower surfaces 70 and 72. The second tongue portion 42 is symmetrical about a second axis 78 of the latch member 18 which intersects the first axis 58 at an acute angle, as shown in FIG. 2, and also has a leading edge 80 spaced from the opening 76 along the axis 78.

The base portion 44 of the latch member 18 is located between the first and second tongue portions 40 and 42. The base portion 44 has upper and lower surfaces 90 and 92 which are coplanar with the upper surfaces 50 and 70 and the lower surfaces 52 and 72 of the first and second tongue portions 40 and 42, respectively. The base portion 44 also has an inner edge surface 94 defining an opening 95 extending through the base portion 44.

The anchor portion 46 of the latch member 18 comprises a pair of arms 96 and an anchor bar 98. The arms 96 extend from the base portion 44 on the same side of the base portion 44 as the second tongue portion 42. The anchor bar 98 extends across the latch member 18 between the ends of the arms 96, and has planar upper and lower surfaces 100 and 102 which are parallel to the upper and lower surfaces 70 and 72 of the second tongue portion 42. The anchor portion 46 of the latch member 18 is symmetrical about the first axis 58. Additionally, the anchor bar 98 and adjacent portions of the arms 96 are spaced from the second tongue portion 42 in the direction of a third axis 106 which is perpendicular to the planar surfaces 72 and 100. A space 104 is thus defined between the anchor bar 98 and the second tongue portion 42, as shown in FIG. 2A.

As shown in FIGS. 3 and 3A, a plastic cover 110 is receivable over the latch member 18. The cover 110 has generally the same shape as the base portion 44 and the anchor portion 46 of the latch member 18. The cover 110 has a first opening 112, a locking tab 114, and a second opening 116. The locking tab 114 is receivable through the opening 95 in the base portion 44 of the latch member 18, and has a lip 118 engageable with the lower surface 92 of the base portion 44 to hold the cover 110 on the latch member 18. The second tongue portion 42 of the latch member is receivable through the opening 112 in the cover 110. When the cover 110 is received over the latch member 18, the opening 116 is located between the arms 96, as shown in FIG. 3A. The opening 116 is thus located in a position for the lap belt 12 to extend in a loop around the anchor bar 98 and through the opening 116, as shown in FIG. 6.

Figure 4:
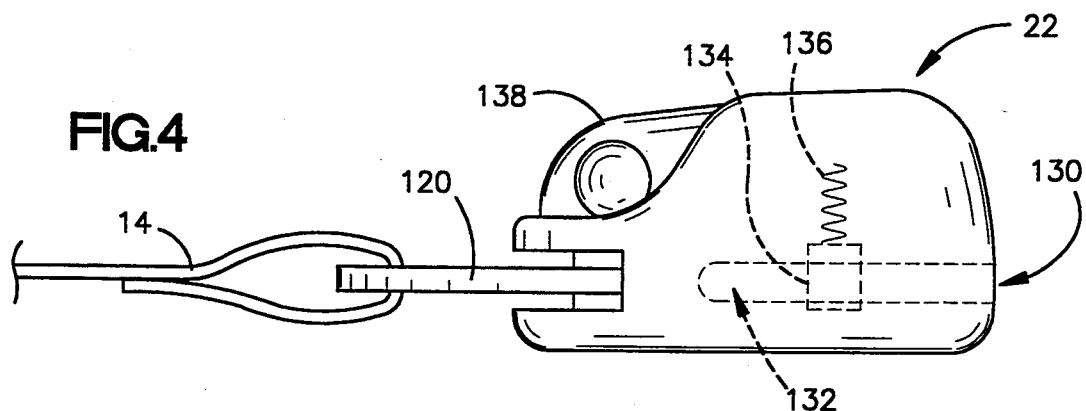
FIG. 4 is a view of parts of the apparatus of FIG. 1 in a first condition.
Figure 4A:
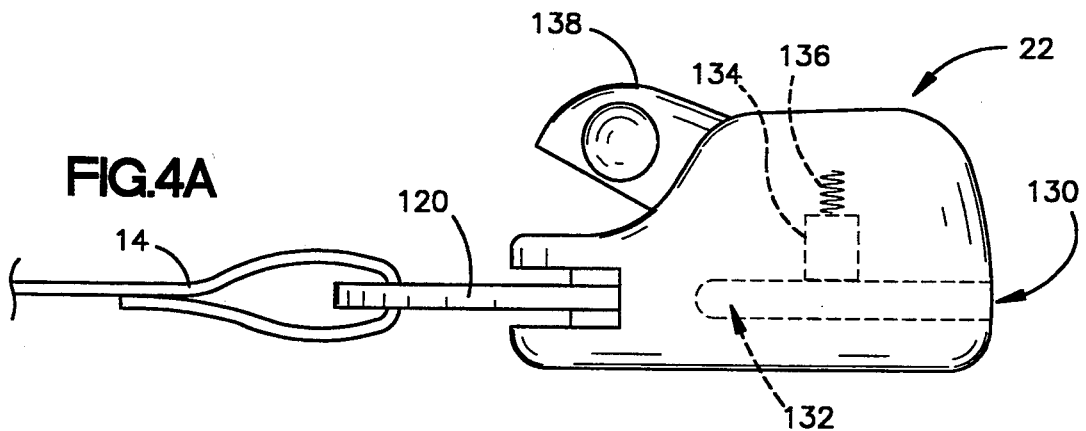
FIG. 4A is a view of the parts of FIG. 4 in a second condition.

In the preferred embodiment of the invention, the buckle 22 connected to the shoulder belt 14 is constructed in accordance with the invention set forth in applicant's co-pending patent application Ser. No. 800,444, filed Nov. 26, 1991, entitled "Seat Belt Buckle". As shown schematically in FIGS. 4 and 4A, the buckle 22 has an anchor bar 120 around which one end of the shoulder belt 14 is fastened in a loop. The buckle 22 also has an opening 130, an internal passage 132 and a movable locking member 134. A spring 136 and a lever 138 cooperate with each other to move the locking member 134 back and forth between a locking position shown in FIG. 4 and an unlocking position shown in FIG. 4A. When the locking member 134 is in the locking position, it extends across the passage 132. Alternatively, a buckle known in the prior art, such as the buckle 26, could be substituted for the preferred buckle 22 at the end of the shoulder belt 14.

Figure 5:
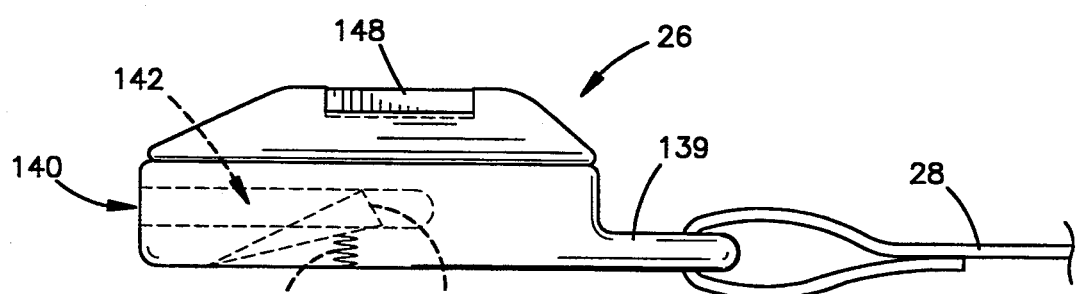
FIG. 5 is a view of parts of the apparatus of FIG. 1 in a first condition.
Figure 5A:
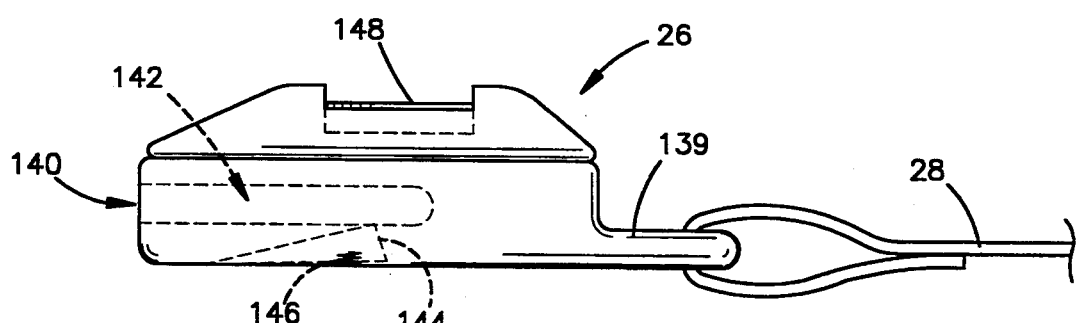
FIG. 5A is a view of the parts of FIG. 5 in a second condition.

As shown schematically in FIGS. 5 and 5A, the buckle 26 has an anchor bar 139 around which one end of the strap 28 is fastened in a loop. The buckle 26 also has an opening 140, an internal passage 142 and a locking member 144. A spring 146 and a pushbutton member 148 cooperate with each other in a known manner to move the locking member 144 back and forth between a locking position shown in FIG. 5 and an unlocking position shown in FIG. 5A. When the locking member 144 is in the locking position, it extends into the passage 142.

The latch member 18, the buckle 22 and the buckle 26 are releasably connectable to each other to releasably hold the lap belt 12 and the shoulder belt 14 in their restraining positions extending across an occupant of the seat 10. As indicated in FIGS. 6 and 7, the first tongue portion 40 of the latch member 18 is movable into the passage 142 in the buckle 26 through the opening 140 in the direction of the first axis 58 of the latch member 18. When the first tongue portion 40 is received in the passage 142, the buckle 26 operates in a known manner to move the locking member 144 into the opening 56 in the first tongue portion 40 to lock the latch member 18 to the buckle 26. The lap belt 12 is thus connected to the buckle 26 through the latch member 18.

The second tongue portion 42 of the latch member is similarly movable into the passage 132 in the buckle 22 through the opening 130 in the direction of the second axis 78. When the second tongue portion 42 is received in the passage 132, the buckle 22 operates to move the locking member 134 into the opening 76 to lock the latch member 18 to the buckle 22. The shoulder belt 14 is thus connected to the buckle 26 through the latch member 18. If the occupant of the seat 10 chooses to use only the lap belt 12, the shoulder belt 14 can be retracted independently of the lap belt 12 upon releasing the buckle 22 from the latch member 18.

When the latch member 18, the buckle 22 and the buckle 26 are connected to each other as shown in FIG. 7, they are restrained from moving relative to each other. Additionally, the first tongue portion 40 and the anchor portion 46 of the latch member 18 are both symmetrical about the first axis 58, and the second tongue portion 42 overlies the anchor portion 46 (FIGS. 2, 2A). Therefore, the loop at the end of the lap belt 12 and the buckle 26 are both centered on the first axis 58 of the latch member 18, as shown in FIG. 6. The buckle 22 extends into the space 104 (FIG. 2A) and thus overlies the loop in the lap belt 12. As shown in FIG. 7, the buckle 22 therefore is not spaced from the buckle 26 in the direction of the third axis 106. The latch member 18 thus connects the lap belt 12, the buckle 22 and the buckle 26 to each other in a compact arrangement.

From the above description of the invention, those skilled in the art will perceive improvements, changes and modifications. Such improvements, changes and modifications within the skill of the art are intended to be covered by the appended claims.

Having described the invention, the following is claimed:

1. A latch member for a vehicle occupant restraint apparatus comprising first and second seat belt buckles, each of said seat belt buckles having a passage and a movable locking element for locking a tongue in the passage, said latch member comprising:

anchoring means including an anchor portion for attachment to the vehicle;

a first tongue portion movable into the passage in said first seat belt buckle, said first tongue portion having a surface means for defining a first opening for receiving the locking element of said first seat belt buckle to lock said first tongue portion in said first seat belt buckle;

a second tongue portion movable into the passage in said second seat belt buckle, said second tongue portion having a surface means for defining a second opening for receiving the locking element of said second seat belt buckle to lock said second tongue portion in said second seat belt buckle;

said first tongue portion further having a leading edge spaced from said first opening in a first direction and being movable into said passage in said first seat belt buckle in said first direction, said second tongue portion further having a leading edge spaced from said second opening in a second direction and being movable into said passage in said second seat belt buckle in said second direction;

said first tongue portion being symmetrical about a first axis extending in said first direction, said second tongue portion being symmetrical about a second axis extending in said second direction;

said anchor portion comprising a bar for engaging a loop in a seat belt, said bar being symmetrical about said first axis; and said second tongue portion having a planar upper surface surrounding said second opening and a planar lower surface surrounding said second opening, said upper and lower surfaces being parallel to each other, said second tongue portion overlying said bar and being spaced from said bar in a direction perpendicular to said upper and lower surfaces.

* * * * *